Patented May 23, 1939

2,159,194

UNITED STATES PATENT OFFICE 2,159,194

METHOD OF MAKING PECTIN PRODUCTS

Clarence Walter Wilson, Corona, Calif., assignor to California Fruit Growers Exchange, Los Angeles, Calif., a corporation of California No Drawing. Application October 1, 1936, Serial No. 103,574

1 Claim. (Cl. 99—132)

This invention relates to pectin products, and methods for the preparation thereof.

The advantages and disadvantages of liquid pectin are well known. Likewise the advantages and disadvantages of dry pectin are well known.

In particular the tendency of dry powdered pectin to lump or ball up when brought into contact with water is known; as is also its tendency to dust considerably when handled.

Dry pectin particles, in order to go into solution rapidly should be rather finely powdered. Powdered substances, as for example, powdered dextrose, have been added to dry pectins, for the purpose of diluting the pectin to a lower strength. With pectins of the strengths now ordinarily produced commercially, such as 120 grade to 160 grade from apples, and 140 grade to over 200 grade from citrus fruits, if only enough powdered spacing or diluting agent be added to reduce the jelly grade to, say, 100, the mixture will lump or ball up badly when placed in contact with water. Likewise, such powdered mixtures tend to dust considerably in use.

I have now discovered that these and other disadvantages can be overcome by liquefying a suitable crystalline water-soluble substance, as by means of heat, and cooling the same, these operations being so conducted that the material after treatment is in the crystalline condition or form, the powdered pectin being uniformly incorporated in the liquefied material before re-solidification.

Accordingly, an object of this invention is to provide and disclose methods and means for the production of a readily water-soluble pectin preparation which will not lump or dust in use.

Another object of this invention is to provide and disclose pectin preparations comprising pectin and a crystalline, water-soluble substance, in such form that dusting and lumping are substantially eliminated.

Other objects, uses, and advantages will appear more fully and at large hereinafter. Some will be obvious from a reading of the description and claim, and others will appear to those skilled in the art, in the contemplation and use of the invention.

Broadly conceived, any suitable crystalline material may be employed.

As a specific, but not necessarily limiting example, I may employ the ordinary dextrose hydrate of commerce. I may take a suitable quantity of dextrose and, for example, an equal weight of dry powdered pectin of 200 grade. The dextrose is heated until substantially liquefied, with definite crystal nuclei remaining in the fluid mass. The pectin is then mixed in.

I have found that in such a mixture the dextrose tends to revert rapidly to crystalline form. I prefer, before re-solidification becomes complete, to pass the mixture through a suitable foraminous device, so as to produce particles of desirable size. As an example, a device with openings equivalent to a screen having 20 meshes per inch may be employed. Other sizes may be employed.

The particles produced by the steps just described are readily soluble in water. They are entirely free from any tendency to dust or lump when brought into contact with water.

By the particular example given, obviously a product of 100 grade will be obtained.

Although I have not made a detailed microscopic study of this product, I envision the particles thereof particularly from the method of preparation, as essentially comprised of a matrix of dextrose hydrate crystals in which the fine pectin particles are embedded. The dextrose being in crystalline form, the product is entirely free from hygroscopicity.

Dextrose referred to hereinabove, when used in this connection, makes a product particularly useful in making jams, jellies, and the like, and one readily acceptable in the trade, since it has been the practice for many years to mix powdered pectin with powdered dextrose before marketing the pectin.

Other suitable crystalline materials may be substituted for the dextrose, whenever they will be acceptable as ingredients of the final product into which the pectin preparation is to enter.

Obviously numerous changes and modifications may be introduced without departing from the spirit of my invention. All such changes and modifications as come within the scope of the appended claim are intended to be embraced thereby.

Having thus described my invention in such full, clear, concise, and exact language as to enable others skilled in this art to make, compound, and use the same, I claim as my invention and desire to secure by Letters Patent, the following:

A method for the preparation of a granular pectin product comprising the steps of heating substantially dry dextrose hydrate at a temperature and for a time sufficient to convert the same to a substantially liquefied form having crystalline nuclei therein contained, adding to and mixing with the substantially liquefied dextrose a quantity of dry powdered pectin particles and cooling the mixture to form a dry crystalline mass having the powdered pectin particles discontinuously embedded throughout.

CLARENCE WALTER WILSON.